United States Patent [19]

Viola et al.

[11] Patent Number: 5,715,919
[45] Date of Patent: Feb. 10, 1998

[54] CLUTCH MECHANISM, ESPECIALLY FOR A MOTOR VEHICLE

[75] Inventors: Paolo Viola, Paris; Michelle Sevennec, Sainte Gemme, both of France

[73] Assignee: Valeo, Paris, France

[21] Appl. No.: 481,463

[22] PCT Filed: Nov. 8, 1994

[86] PCT No.: PCT/FR94/01299

§ 371 Date: Jul. 10, 1995

§ 102(e) Date: Jul. 10, 1995

[87] PCT Pub. No.: WO95/13481

PCT Pub. Date: May 18, 1995

[30] Foreign Application Priority Data

Nov. 9, 1993 [FR] France .................. 93 13340

[51] Int. Cl.$^6$ .................. F16D 13/58; F16D 13/71
[52] U.S. Cl. .................. 192/70.18; 192/89.23
[58] Field of Search .................. 192/70.18, 70.17, 192/70.16, 70.28, 89.23, 200, 109 R

[56] References Cited

U.S. PATENT DOCUMENTS

| 3,450,241 | 6/1969 | Kuno ............ | 192/70.18 |
|---|---|---|---|
| 5,236,070 | 8/1993 | Simoncic et al. ............ | 192/70.28 |

FOREIGN PATENT DOCUMENTS

| 0535702 | 4/1993 | European Pat. Off. . | |
|---|---|---|---|
| 1554782 | 1/1969 | France . | |
| 2546999 | 12/1984 | France . | |
| 2547001 | 12/1984 | France . | |
| 2692637 | 12/1993 | France . | |
| 32 24 405 | 1/1984 | Germany ............ | 192/70.18 |
| 2176549 | 12/1986 | United Kingdom . | |

*Primary Examiner*—Rodney H. Bonck
*Attorney, Agent, or Firm*—Longacre & White

[57] ABSTRACT

The clutch mechanism comprises a cover plate (4), a diaphragm (5) bearing on the cover plate (4), assembly (8) applying the diaphragm (5) pivotally to the cover plate (4), and extending through the diaphragm (5) via widened apertures (53), together with at least one pressure plate (3) on which the diaphragm (5) bears by virtue of an annular projecting engagement element (31), which is divided into engagement sectors. The assembly (8) carries a support crown (71) which is coupled in rotation to the assembly (8), and which is extended in its plane and at its outer periphery by drive tongues (70) which extend through the projecting engagement element (31) of the pressure plate (3). The tongues (70) are adapted to be fixed at their free end to the pressure plate (3). In a modification, the drive tongues (70) are fixed with respect to a secondary abutment member (6, 60, 160) carried by the assembly (8).

6 Claims, 4 Drawing Sheets

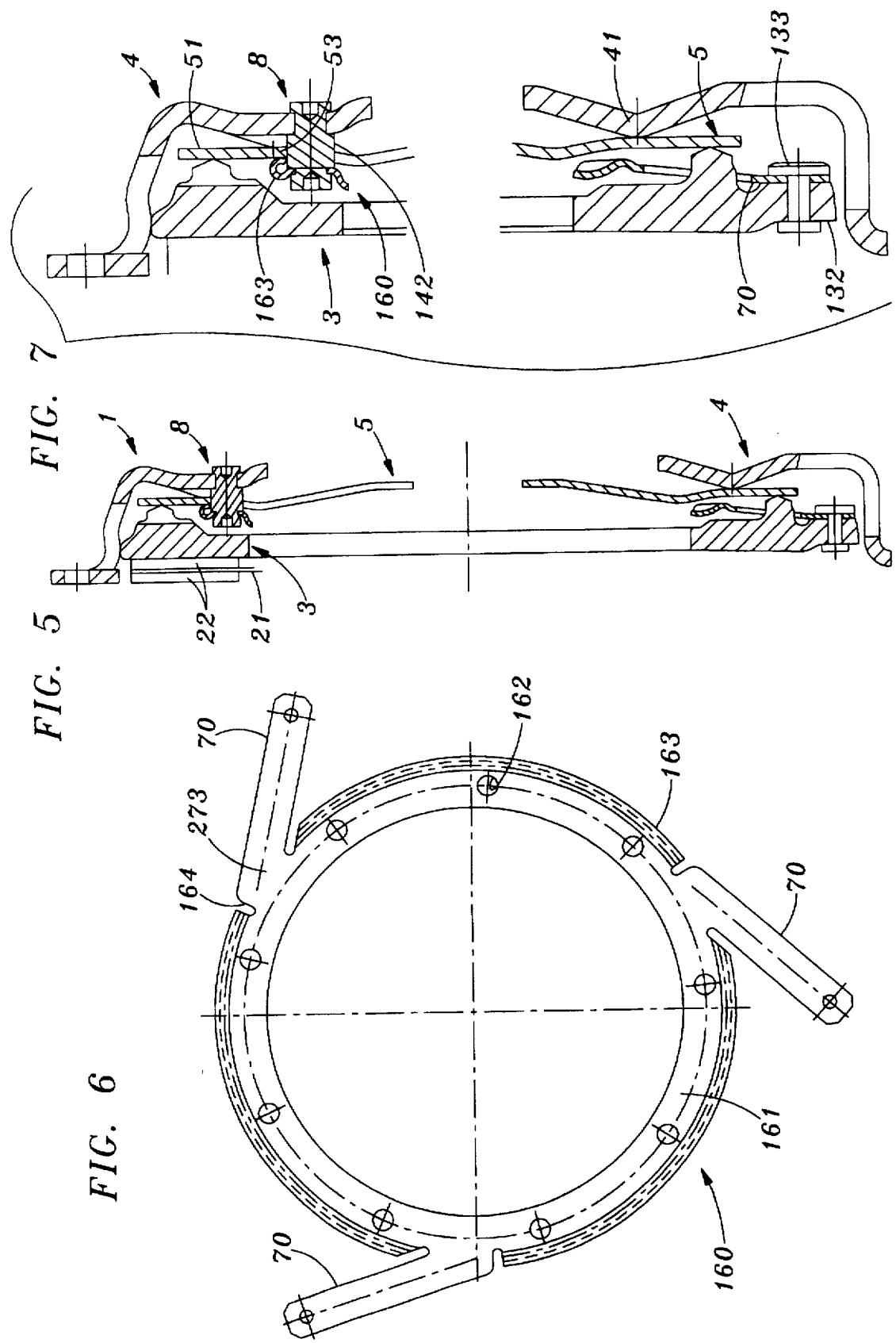

CLUTCH MECHANISM, ESPECIALLY FOR A MOTOR VEHICLE

The present invention relates to a diaphragm clutch mechanism, especially for a motor vehicle.

More particularly, the invention is concerned with a clutch mechanism of the type comprising a first member having a generally annular form, known as a cover plate, which is adapted to be applied on the reaction plate of the clutch, a second member of generally annular shape referred to as a diaphragm, which bears on the cover plate and which comprises a peripheral portion defining a Belleville ring together with a central portion which is divided into radial fingers by slots for cooperation with a clutch release bearing, assembly means extending through the diaphragm via widened apertures defined by the slots of the diaphragm in the vicinity of the inner periphery of the Belleville ring of the diaphragm, with the said assembly means carrying a secondary abutment in facing relationship to a primary abutment which is carried by the cover plate, whereby to apply the diaphragm pivotally to the cover plate, and at least one plate, referred to as a pressure plate, which is fixed with respect to the cover plate for rotation with the latter while being mounted for axial movement with respect to it, and on which the peripheral portion of the diaphragm bears via an annular projecting engagement element which is divided into annular engagement sectors and which is formed at the outer periphery of the pressure plate for this purpose.

Such a mechanism is described in the document EP-A-0 535 702, and in the Application FR 2 692 637 filed on 19 Jun. 1992. In the document EP-A-0 535 702, the assembly means comprise retaining lugs, which are relatively thin and flat, being integral with the cover plate, and which extend axially through the diaphragm and have a locating bend at their free end.

These assembly means also carry at least one secondary abutment member in the form of a ring crown which provides a secondary abutment for the diaphragm, the said ring crown being interposed axially between the diaphragm and a support crown which is engaged on the retaining lugs, and which is located in one axial direction on the locating bend formed on the retaining lugs at their free end.

In the document FR 2 692 637, the assembly means comprise rivets which pass axially through the said apertures of the diaphragm, and which also carry a secondary abutment member in the form of a ring crown which is interposed axially between the diaphragm and a support crown fixed to the rivets.

The cover plate of the mechanism does of course offer a primary abutment in facing relationship with the secondary abutment, in such a way that the diaphragm is mounted pivotally between its primary and secondary abutments, located radially inwardly of the projecting engagement element of the pressure plate.

An object of the present invention is to make further use of the components carried by the assembly means.

In accordance with the invention, a clutch mechanism of the type described above is characterised in that one of the elements consisting of the secondary abutment member and the support crown is coupled in rotation to the said assembly means by mating cooperation therewith, and is extended at its outer periphery, by drive tongues which extend away from its plane and are fixed with respect to the said element, and which extend through the projecting engagement element of the pressure plate via slots separating the said engagement sectors, and in that the said tongues are adapted to be secured at their outer end to the pressure plate, in such a way that they couple the pressure plate to the cover plate, for rotation with it but with axial mobility thereon.

In one embodiment, the assembly means carry only one secondary abutment member, so that it is the latter that includes the drive tongues according to the invention.

Thanks to the invention, the support crown or the secondary abutment member provides a rotary coupling, with axial mobility, for the pressure plate with respect to the cover plate. By means of these drive tongues, it gives the pressure plate a return action.

It will be appreciated that the assembly means are retained, to the benefit of standardisation.

As a result, the cover plate is simplified, because there is no longer any need to provide holes in the latter for fastening the tangential tongues that conventionally provide the rotary coupling of the pressure plate to the cover plate.

The radial flange of the cover plate is accordingly stiffened.

In addition, since the drive tongues according to the invention have a root zone which lies radially inwardly of the projecting engagement elements of the pressure plate, the result is obtained that the cover plate is indented to a lesser extent at the level of the extreme ends of the tongues. In this connection, the cover plate conventionally has the form of a hollow plate, and it is necessary to recess the annular skirt portion and the annular fastening flange of the latter in order to permit the tangential tongues to be accommodated. It is these tongues that determine the size of the slots in the cover plate.

Thanks to the invention, the size of the slots, especially in the circumferential direction, can be reduced in such a way that the cover plate is stiffened, leading to improved lift of the pressure plate during release of the clutch.

In one embodiment, the tongues are inclined, each of them being fixed to a projecting element formed on the pressure plate at its outer periphery.

Thanks to the invention, this projecting element is of reduced size as compared with conventional lugs formed on the pressure plate for the fastening of the tangential tongues.

As a result, the diametral size of the pressure plate, and therefore of the mechanism, is reduced, since the lugs in the prior art usually extend through the skirt portion of the cover plate.

In the present invention, the projecting elements do not necessarily pass through the skirt portion of the cover plate, and in all cases, components of the motor vehicle can be brought very close to the cover plate. In a second embodiment, the tongues may extend radially, being recessed to allow the annular engagement sectors of the pressure plate to pass.

In every case, the number of components is reduced as compared with the prior art, because the tongues are fixed with respect to the support crown or the secondary abutment member, the latter being preferably heat treated so as to give them the desired elasticity.

In addition, the number of fasteners required for securing the tongues is also reduced.

Besides this, the danger of any error is reduced. In this connection, in the prior art there was a danger of error as regards the choice of tongues, which are stored separately.

Thanks to the invention, this danger of error is eliminated, because the support crown or the secondary abutment member carries the tongues.

In addition, fitting of the mechanism is greatly facilitated since, by virtue of the invention, it is possible to form a unitary sub-assembly comprising the cover plate, with its primary and secondary abutments, together with the drive tongues carried by one of the elements consisting of the support crown and the secondary abutment member.

This sub-assembly may be made in one production unit and be finally assembled with the pressure plate in another production unit, with only one operation being necessary for fixing the tongues.

When the assembly means consist of axial lugs, it is sufficient to provide apertures at the inner periphery of the support crown or secondary abutment member, for preventing rotation of the support crown.

When the assembly means comprises rivets, prevention of rotation of the support crown is naturally provided by the rivets.

In one embodiment it is the support crown that carries the drive tongues.

According to one feature, the support crown is treated, being for example subjected to an operation consisting of heating followed by quenching, so as to give it the elasticity desired for its drive tongues.

The secondary abutment of the diaphragm is of course not necessarily carried by a ring crown, but it may for example be formed in a thrust ring.

In every case, the support crown constitutes a tool which absorbs the forces of bending the lugs or the force of upsetting the rivets, so that the secondary abutment of the diaphragm is protected.

A mechanism obtained in this way, in a simple and inexpensive manner, has excellent operating characteristics, a simplified cover plate, a pressure plate which is easily made by moulding, and a support crown which is obtained by a simple press-forming operation.

In addition, the dynamic balancing of the clutch mechanism is improved.

It is of course possible to reverse the structures, in such a way that the secondary abutment member can carry the drive tongues. In a modification, and in the manner mentioned above, the support crown may be omitted, and it is then the secondary abutment member that carries the drive tongues.

In all cases the secondary abutment member, or the support crown, includes an endless annular portion.

After being fitted into the mechanism, the tongues are inclined into the axial direction, and urge the pressure plate towards the cover plate.

Further advantages will appear in the light of the following description, of the attached drawings, in which:

FIGS. 5 and 6 are views similar to FIGS. 1 and 2, for yet another embodiment;

Figure 1:
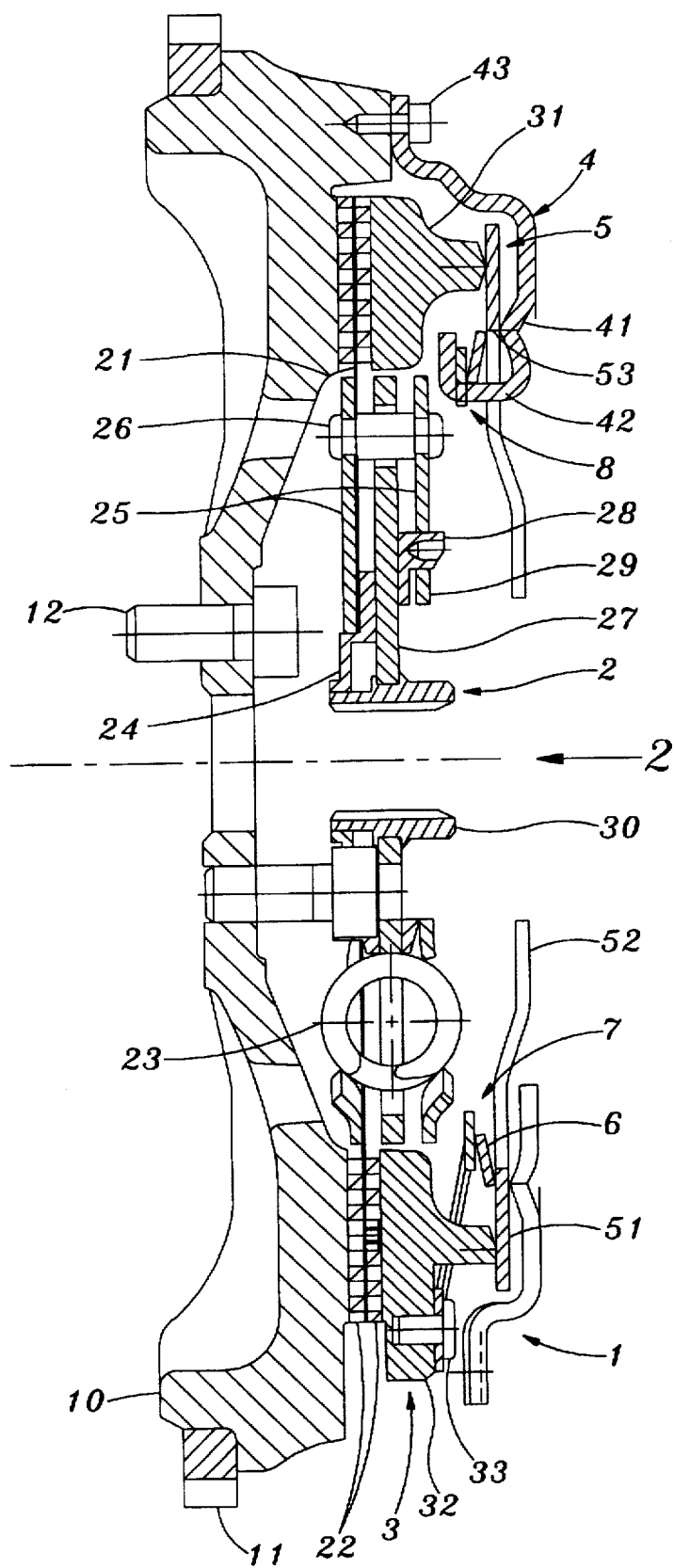
FIG. 1 is a view in axial cross section of a clutch module equipped with a support crown in accordance with the invention.

FIG. 7 repeats part of FIG. 5 on a larger scale.

The drawings show a clutch module for a motor vehicle, constituting a unitary assembly and comprising, in axial succession, a unitary assembly 1 referred to as a clutch mechanism, a clutch friction wheel 2, and a reaction plate 10, also referred to as a flywheel.

The clutch mechanism 1, which in the present case is of the push-to-release type, comprises all assembly of annular components, namely a cover plate 4, a diaphragm 5 and a pressure plate 3. The cover plate and the diaphragm together constitute a unitary assembly, the diaphragm being mounted pivotally between a primary abutment 41, carried by the cover plate 4, and a secondary abutment, which is carried by assembly means 8 in a manner to be described below.

The clutch friction wheel 2 comprises a friction disc 21 which carries, fixed to each of its faces, a friction liner 22, which may be divided into friction pads.

The said disc 21 is coupled, in this example through circumferentially acting springs 23 together with axially acting friction means, to a hub 30 which is splined internally. For this purpose, the disc 21 is fastened to two guide rings 25, which are arranged on either side of a hub plate 27 which is fixed to the hub 30, in this example by seaming.

More precisely, the disc 21 in this example is backed on to one of the guide rings 25, and is fastened to these latter by means of spacers 26 which extend through the hub plate 27 with a circumferential clearance, so as to secure the two guide rings 25 together. The springs 23, which in this example are in the form of coil springs, or in a modified embodiment blocks of elastic material such as blocks of elastomer, are mounted in windows formed in mutually facing relationship in the hub plate 27 and the rings 25, respectively.

The said friction means comprise a bearing 24 which is interposed axially between one of the rings 25 and the hub plate 30, together with a thrust ring 28 and an axially acting resilient ring 29, which in this example is of the Belleville ring type, interposed between the hub plate 27 and the other ring 25.

The ring 29 bears on the appropriate ring 25 so as to act on the thrust ring 28, which is mounted on the said ring 25 for rotation with it in this example, in a manner known per se by means of spigots, and for gripping the bearing 24 between the hub plate 27 and the other ring 25.

The bearing 24, which in this example is of plastics material, is provided with recesses in which are fixed the heads of fastening studs 12 which fasten the clutch module to the crankshaft of the internal combustion engine of the vehicle, in the manner described in the document FR 93 11325, filed on 23 Sep. 1993.

These studs 12 are adapted so that their threaded portion extends through the reaction plate 10, so as to fasten the clutch module to the crankshaft.

Thus in FIG. 1, the position of the studs before the module is fitted into the vehicle can be seen in the lower part of the Figure, while the upper part of the said Figure shows the position of the studs 12 after the module has been fitted in the vehicle.

The hub plate 27 is of course formed with holes through which tools for tightening the studs 12 can pass.

This module accordingly forms a unitary assembly which is dynamically balanced, and which is secured on the crankshaft.

To this end, the cover plate 4 of the mechanism 1 is placed against the reaction plate 10 carrying the starter crown 11. In this example, fastening is obtained by means of screws 43 extending into passages formed in a radial fastening flange of the cover plate 4, which in this example is in the form of a hollow plate with a generally axially orientated annular skirt portion, which joins the said radial flange to a transversely orientated base portion that has a central hole.

In a modification, the fastening of the cover plate 4, and therefore of the mechanism 1, on the plate 10 is obtained with the use of rivets, or by seaming (FIG. 3) or otherwise.

The diaphragm 5 is mounted pivotally on the cover plate 4 by the assembly means 8 referred to above, which attach the cover plate pivotally to the diaphragm.

In a manner known per se, the said diaphragm 5, annular in form, comprises a peripheral portion 51 defining a Belleville ring, and a central portion divided into radial fingers 52 by slots which are widened at the level of the inner periphery of the Belleville ring 51, so as to define widened apertures 53 through which the assembly means 8 extend axially.

These assembly means 8 carry a secondary abutment in facing relationship with a primary abutment 41 carried by the cover plate 4. The secondary abutment is carried by a secondary abutment member 6 to be described below.

The diaphragm 5 is thus mounted for pivoting movement between the primary and secondary abutments.

When the clutch is engaged, the diaphragm 5 bears in the known way on the cover plate 4, and more precisely on the primary abutment 41, so as to urge the pressure plate 3 towards the reaction plate 10 and so to grip the friction liners 22 between the two plates 3, 10.

The torque is thus transmitted from the engine to the input shaft of the gearbox via the friction liners 22 and the internally splined hub 30, so as to couple it in rotation with the said input shaft.

In order to disengage the clutch it is necessary to exert a thrust, by means of a clutch release bearing (not shown), on the inner end of the fingers 52 of the diaphragm, so as to cause the latter to pivot and to remove the force exerted by the diaphragm on the pressure plate 3.

The friction liners 22 are thus disengaged. For this purpose, the diaphragm 5 bears, through the outer peripheral part of its Belleville ring 51, on a projecting annular engagement element 31 which is divided into annular engagement sectors, and which is formed on the pressure plate 3 at its outer periphery.

The diaphragm 5 bears, through the inner peripheral part of its Belleville ring 51, on the primary abutment 41 when the clutch is engaged, and on the secondary abutment 6 when the clutch is caused to shift from its clutch engaged position to its clutch released position.

In this example, the assembly means 8 comprise, as in the document EP-A-0 535 702, flat, thin lugs 42, orientated axially and projecting integrally from the cover plate 4 (from the inner periphery of the base portion of the latter), the said lugs 42 extending axially through the diaphragm 5 via the apertures 53 in the latter.

The primary abutment 41 is defined by a pressed-in portion formed in the base portion of the cover plate. In a modification, it may consist of a ring carried by the cover plate 4.

The secondary abutment is defined by a ring crown 6 which is of generally frusto-conical form, the outer periphery of which is rounded so as to define a secondary abutment in facing relationship with the primary abutment 41. In a modification, the outer periphery of the crown 6 has a V-shaped cross section to define the secondary abutment.

This crown 6 is engaged on the lugs 42 through its inner periphery and with a radial clearance, and constitutes a secondary abutment member because it is this component that carries the secondary abutment.

A support crown 71 is also engaged on the lugs 42, with the said ring crown 6 being interposed axially between the diaphragm 5 and the support crown 71, which is carried by the assembly means 8 like the crown 6.

In a manner known per se, in order to assemble the components together, the free end of the lugs 42 is bent radially away from the axis of the assembly so as to form a locating bend on which the support crown 71 bears axially. This crown is thus located axially, in one axial direction on the bend and in the other axial direction on the ring crown 6, the diaphragm 5 being gripped elastically between the ring crown 6 and the primary abutment 41, with a predetermined load and without any risk of jamming, because the support crown 71 constitutes, in a sense, a tool which absorbs the force of bending the free end of the lugs 42.

In order to engage and disengage the clutch in the way described above, and the driving of the pressure plate 3 in rotation, it is accordingly necessary that the pressure plate 3 should be coupled to the cover plate 4 for rotation with it but with axial mobility.

The invention proposes to make a novel use of one of the elements consisting of the support crown 71 and the secondary abutment member 6.

Thus, in accordance with the invention, a mechanism of the type described above is characterised in that one of the elements consisting of the support crown 71 and the secondary abutment member 6 is coupled in rotation, by mating cooperation, to the said assembly means 8, and is extended by carrying at its outer periphery drive tongues 70 which extend away from its plane, being fixed with respect to the said element and extending through the projecting engagement element 31 via slots 35 which separate each of its annular engagement sectors from the next, and in that the said tongues are adapted to be fixed at their free end to the pressure plate 3, in such a way that they couple the pressure plate 3 to the cover plate 4 for rotation with it but with axial mobility.

The said tongues 70 are bent (FIGS. 1, 3, 5), in such a way that they urge the pressure plate 3 towards the cover plate during the operation of releasing the clutch.

In FIG. 1, the tongues 70 are integral with the support crown 71, and are inclined in the axial and transverse directions. These tongues extend generally tangentially with respect to the outer periphery of the support crown 71. The tongues 70 are accordingly resiliently deformable, and enable the pressure plate 3 to be urged towards the base portion of the cover plate 4.

Figure 2:
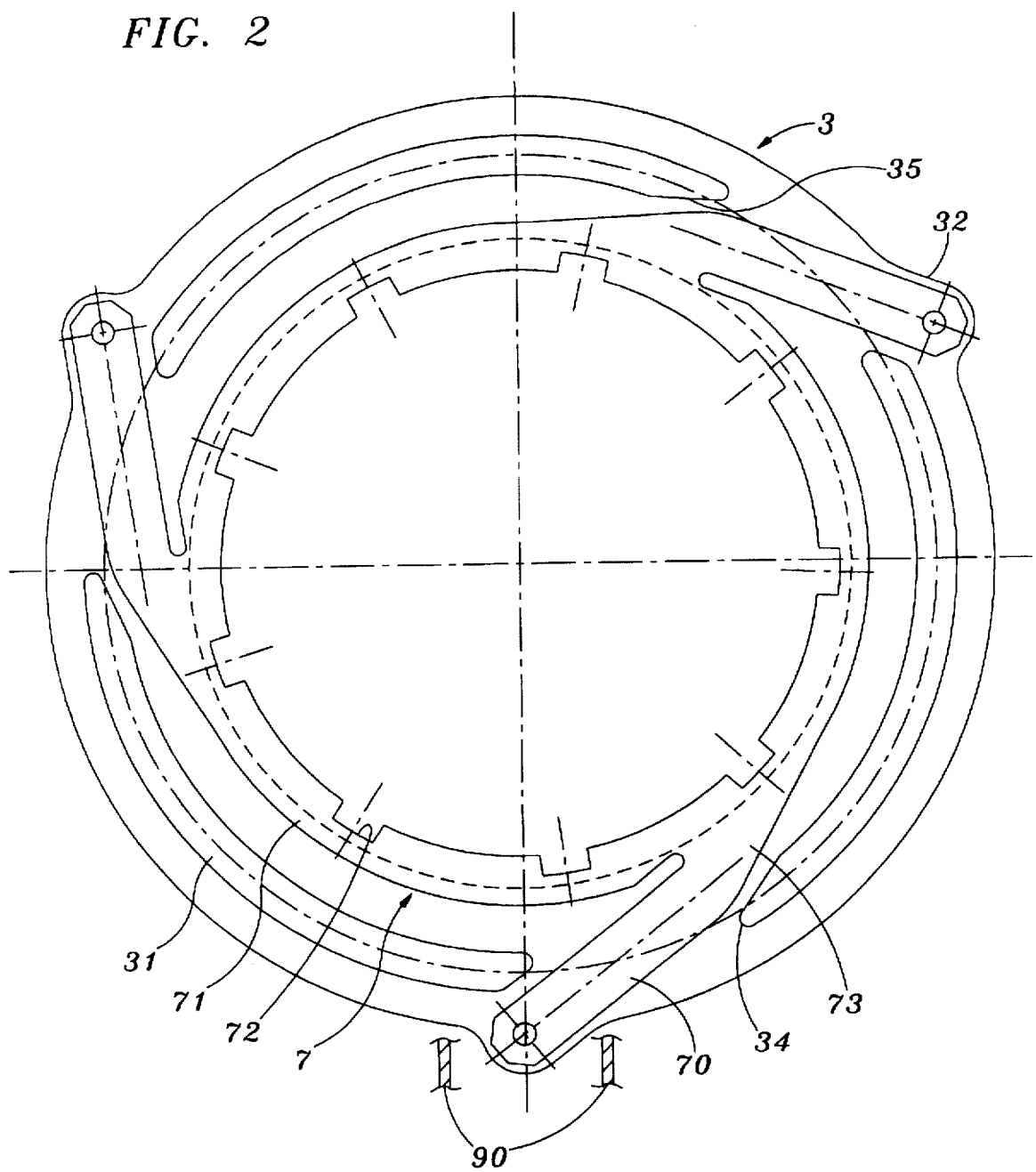
FIG. 2 is a view in the direction of the arrow 2 in FIG. 1, showing the support crown with its associated pressure plate.

The circumferential ends of the annular engagement sectors 31 are profiled and inclined, as can be seen for example at 34 in FIG. 2, so as to enable the tongues 70 to pass. As can be seen in this FIG. 2, the circumferential ends of the engagement sectors 31 are tapered, with each drive tongue 70 being joined to the outer periphery of the support crown 71 through a root zone 73. This root zone reduces in width going towards the centre of the crown 71.

The crown 71 has notches 72 formed in its inner periphery and engaged in a complementary manner on the axially orientated, relatively thin and flat lugs 42 before the latter are bent over.

In this way, a simple mating rotary coupling is obtained between the lugs 42 and the crown 71. In this example this coupling is of the tenon and mortice type. In a modification, the crown 71 could be extended towards the axis of the assembly, in order to define closed passages having a rectangular cross section and adapted to be engaged on the lugs 42 before the latter are bent over.

In this example, there are three tongues 70 and three sectors 31, spaced apart circumferentially at regular intervals. This number does of course depend on the application. In the present example nine notches 72 are provided, the number of these being dependent on the number of the lugs 42.

It will be noted that the greater part of the root zones 73 lies between two notches 72.

The pressure plate 3, which is made of a mouldable material, and which is a casting in this example, has at its outer periphery three radially projecting elements 32 that match the shape of the free ends of the drive tongues 70, being formed with holes at their free ends for accommodating fastening members 33, which in this example are pins having a head engaged on the tongues 70, and a shank which is force-fitted into a hole formed in the projecting element 32, which in this example is generally semicircular in shape, of the pressure plate 3.

Preferably, and in a known manner, the pins 33 are knurled for this purpose. Fastening of the pins 33 can of course be obtained by adhesive bonding or otherwise, and in a modification, these pins 33 may be replaced by rivets (FIG. 7), or any other fastening member such as bolts.

The support crown 71 is preferably heat treated so as to give the tongues 70 the desired elasticity.

In this connection, a heating operation, following by quenching, is preferably carried out.

As will be understood, the crown 71, which in this example is of metal, is obtained with its tongues 70 readily by a press-forming operation, and it is possible to form a sub-assembly, consisting of the cover plate and support crown, which can finally be attached on to the pressure plate 3 by means of the pins 33.

As will appear from FIG. 2, the projecting elements 32 have a small radial dimension, so as to reduce the radial size of the clutch mechanism 1. Dynamic balancing of the mechanism is also facilitated.

It will also be noted that the slots formed in the radial flange portion of the cover plate 4 and in the axially orientated skirt portion of the latter are of reduced dimensions, especially in the circumferential direction, as compared with those in the prior art, the said slots being matched to the size of the projecting elements 32 so that the cover plate is stiffened.

Thus, FIG. 2 shows in two lines at 90 the limits of the said slot. This slot in the radial flange portion of the cover plate is necessary in order to enable the tool used for fastening the pins 33 to the pressure plate 3 to pass through.

The present invention is of course not limited to the embodiment described, and in particular the tongues 70 may extend radially.

For example, in FIG. 2 the tongues may extend in the radial direction through a slot 35. These tongues are then triangular in shape, so as to have a free end which enables the pressure plate 3 to be fastened by means of the pins 33. These tongues are therefore resiliently deformable by virtue of their triangular configuration, and preferably, as in FIGS. 1 and 2, the support crown 71 is heat treated so as to give the tongues the required elasticity.

The pressure plate 3 also carries at its outer periphery projecting elements for the fastening of the pointed free ends of the radial tongues. These projecting elements match the shape of the said free end, having a hole for passage of the fastening pins 33 or of any other fastening member, such as rivets, bolts or the like.

It is of course possible to increase the number of annular engagement sectors 31, and in that case to increase the width of the radial tongues, with the latter then having a central slot through which an annular sector 31 extends. In this case, the tongues lie in two consecutive slots 35.

The assembly means may of course consist, as described in the document FR 92 07514, of rivets secured to the cover plate and enabling the support crown 71 to be fastened by seaming. In this case, the support crown 71 is located axially in both directions by the assembly means 8, whereas in FIG. 1 the said crown was located axially in only one direction by the said assembly means 8.

In this case, the crown 71 is extended towards the axis of the assembly, in order to define holes through which the rivets pass before the support crown 71 is riveted.

In this case the ring crown 6 is inclined in the opposite direction from that in FIG. 1. This ring crown 6 bears at its outer periphery on the support crown and at its inner periphery on the diaphragm 5.

Any other assembly means may be envisaged, and for example these assembly means may consist of a plurality of comb-shaped annular sectors, engaging on the outer face of the base portion of the cover plate through their annular portion joining together the teeth of the comb, with the said teeth passing through the apertures 53 in the diaphragm so as to be bent radially outwardly into contact with the support crown 71.

The ring crown 6 may be replaced by a ring having the secondary abutment and constituting the secondary abutment member.

Figures 3, 4:
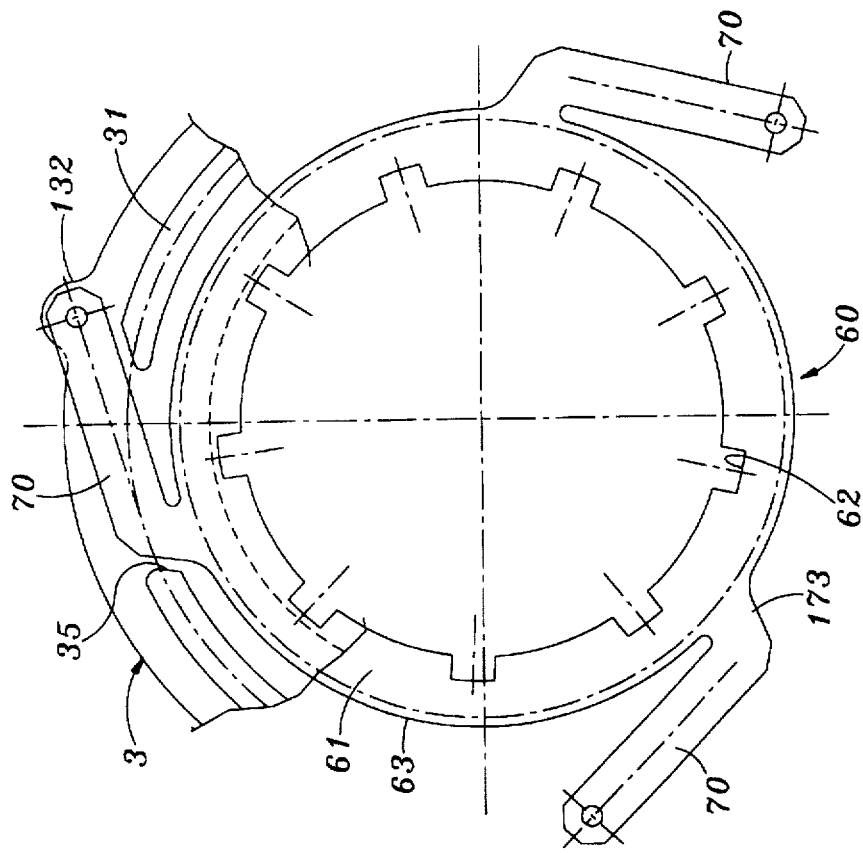
FIGS. 3 and 4 are views similar to FIGS. 1 and 2, but for another embodiment.

It is of course possible to reverse the structures as shown in FIGS. 3 and 4, in which those elements common to FIGS. 1 and 2 are given the same reference numerals.

Thus, in FIGS. 3 and 4, it is the secondary abutment member 60 that carries integrally the drive tongues 70, which are inclined in the axial and transverse directions. Each of these tongues has a free end through which the fastening pins 33 are engaged, these being engaged in a blind hole formed in the projecting elements 132 of the pressure plate.

These radial projecting elements 132 are modified as compared with those in FIGS. 1 and 2, and in the present example they are in the form of semicircular ears which project from the outer periphery of the plate 3.

The ring crown 60 has a continuous circular crown portion 61 which has internal notches 62 identical with the notches 72 in FIG. 2, for fitting on the lugs of the assembly means 8 and for coupling in rotation with the latter by mating cooperation.

This crown portion is rounded at 63 in its outer periphery, so as to define the secondary abutment which is interrupted by the tongues 70. The tongues 70 are joined to the crown portion 60 through a root zone 173 which is inclined to a lesser extent than in FIG. 2.

These root zones 73 are located in the slots 35 which separate two annular engagement sectors 31 of the pressure plate 3.

It will be noted that the cover plate 4 is attached on the reaction plate 10 by seaming, the said cover plate being extended at the outer periphery of its axial fastening flange by an axially orientated annular extension, which is deformed so as to be engaged in a groove of the reaction plate or flywheel.

In a modification (FIGS. 5 to 7), the assembly means may consist of rivets 142 which are secured to the base portion of the cover plate 4, for fastening the secondary abutment member 160.

In this Figure, no support crown is provided, and the engagement member 160 is fastened by seaming to the rivets 142 that extend through the diaphragm 5 via the apertures 53.

The abutment member 160 has a crown portion 161, which is formed with holes 162 from place to place for fastening it by seaming to the rivets 142. This crown member has a toroidal secondary abutment 163 at its outer periphery.

This abutment is interrupted by the root zones 273 of the tongues 70 joining them to the crown portion 161. As can be seen in FIG. 6, a slot 164 separates the secondary abutment 163 from the root zone 273.

The tongues 70 are secured by means of rivets 133 to the projecting elements 132, which are in the form of a half moon, of the pressure plate 3.

In a modification, the support crown 71 can be omitted in FIG. 3, so that the ring crown is mounted on the assembly means 8 as in the document U.S. Pat. No. 4,751,991. This crown portion then carries the drive tongues as in FIG. 3.

The clutch mechanism may of course not necessarily be part of a module, and it may be attached on a reaction plate which is fitted in advance on the crankshaft of the engine, for example by means of a threaded connection.

Similarly, the clutch friction wheel 2 may be of the rigid type, with its disc 21 being fastened directly on the hub plate 27, which may be integral with the hub 30.

The clutch may have a plurality of pressure plates. The diaphragm 5 may, instead of being mounted inside the cover plate 4, that is to say on the same side as that surface of the cover plate that faces towards the pressure plate 3 as in FIGS. 1 and 2, be mounted outside the cover plate, with the pressure plate then extending through the base portion of the cover plate by its annular engagement sectors.

In that case, the pressure plate may have axially orientated projecting elements passing through the cover plate and enabling the tangential tongues to be fastened.

Finally, the drive tongues 70 may be made of plastics material, either reinforced or not, being moulded on to the support crown 71 or on to the secondary abutment member 6, 60.

In all cases, the drive tongues (70) are fixed to the element consisting of the support crown 71 or the secondary abutment member 6, 60 as the case may be, so that their root portions are in the plane of the latter, and so that no fastening member is present that could hinder the movement of the pressure plate 3.

We claim:

1. A clutch mechanism, comprising a cover plate (4), adapted to be attached on the reaction plate (10) of a clutch, a diaphragm (5) bearing on the cover plate (4) and comprising a peripheral portion (51) which defines a Belleville ring together with a central portion divided into radial fingers (52) by slots for cooperation with a clutch release bearing, assembly means (8) applying the diaphragm (5) pivotally to the cover plate (4) and extending through the diaphragm (5) via widened apertures (53) formed in the diaphragm (5) in the region of the inner periphery of its Belleville ring (51), and at least one pressure plate (3), which is secured to the cover plate (4) for rotation with the cover plate while being mounted for axial movement with respect to the cover plate, and on which the peripheral portion (51) of the diaphragm (5) bears by virtue of an annular projecting engagement portion (31), which is divided into engagement sectors and which is disposed for this purpose at the outer periphery of the pressure plate (3), wherein, firstly, a support crown (71) is located in at least one axial direction on the assembly means (8), and secondly, a secondary abutment member (6, 60, 160) is interposed axially between the diaphragm (5) and the support crown (71), the cover plate (4) carrying a primary abutment (41) in facing relationship with a secondary abutment carried by the secondary abutment member (6, 60, 160), with the diaphragm (5) being interposed between the abutments, characterized in that one of the elements consisting of the support crown (71) and the secondary abutment member (6, 60, 160) is coupled in rotation to the assembly means (8) by mating cooperation therewith, and is extended at its outer periphery, by drive tongues (70) which extend away from its plane and are fixed with respect to the element, and which extend through the projecting engagement portion (31) of the pressure plate (3) via slots (35) separating the engagement sectors, and in that the tongues (70) are adapted to be secured at their outer end to the pressure plate (3), in such a way that the tongues couple the pressure plate (3) to the cover plate (4), for rotation with the cover plate but with axial mobility thereon.

2. A clutch mechanism, comprising a cover plate (4), adapted to be attached on the reaction plate (10) of a clutch, a diaphragm (5) bearing on the cover plate (4) and comprising a peripheral portion (51) which defines a Belleville ring together with a central portion divided into radial fingers (52) by slots for cooperation with a clutch release bearing, assembly means (8) applying the diaphragm (5) pivotally to the cover plate (4) and apertures (53) formed in the diaphragm (5) in the region of the inner periphery of its Belleville ring (51), and at least one pressure plate (3), which is secured to the cover plate (4) for rotation with the cover plate while being mounted for axial movement with respect to the cover plate, and on which the peripheral portion (51) of the diaphragm (5) bears by virtue of an annular projecting engagement portion (31), which is divided into engagement sectors and which is disposed for this purpose at the outer periphery of the pressure plate (3), wherein said assembly means (8) carry a secondary abutment member (6, 60, 160), said cover plate (4) carrying a primary abutment (41) in facing relationship with a secondary abutment carried by the secondary abutment member, with the diaphragm (5) being interposed between said abutments, characterized in that the secondary abutment member (6, 60, 160) is coupled in rotation to said assembly means (8) by mating cooperation therewith, and is extended, in its plane and at its outer periphery, by drive tongues (70) which are fixed to said secondary abutment member, and which extend through the projecting engagement portion (31) of the pressure plate (3) via slots (35) separating said engagement sectors, and in that said tongues (70) are adapted to be secured at their outer end to the pressure plate (3), in such a way that said tongues couple the pressure plate (3) to the cover plate (4), for rotation with the cover plate and with axial mobility thereon.

3. A mechanism according to claim 1, wherein the drive tongues (70) are inclined, and extend generally tangentially with respect to the element, consisting of the support crown (71) or secondary abutment member (6, 60), with respect to which said tongues are fixed.

4. A mechanism according to claim 3, wherein each drive tongue (70) is joined to its element consisting of the support crown (71) or secondary abutment member (6, 60), with respect to which it is fixed, through a root zone (73, 173) which reduces in width towards the centre of the support crown (71).

5. A mechanism according to claim 1, wherein one of the elements consisting of the support crown (70) and the secondary abutment member (6, 60, 160), with respect to which the tongues are fixed, has at its inner periphery notches (72) which are engaged, in a complementary manner, on lugs (42) which are orientated axially, being relatively thin and flat, and which are part of the assembly means (8).

6. A mechanism according to claim 1, wherein the circumferential ends of the annular engagement sectors (31) of the pressure plate (3) are profiled and inclined, to enable the drive tongues (70) to pass.

* * * * *